Feb. 16, 1960 R. SERRELL 2,925,220

FUNCTION GENERATOR

Filed Sept. 30, 1954 7 Sheets-Sheet 1

INVENTOR.
ROBERT SERRELL

BY Morris A. Rabkin

ATTORNEY

INVENTOR.
ROBERT SERRELL
BY Morris A. Rabin
ATTORNEY

INVENTOR.
ROBERT SERRELL
BY Morris L. Rabin
ATTORNEY

Feb. 16, 1960 R. SERRELL 2,925,220

FUNCTION GENERATOR

Filed Sept. 30, 1954 7 Sheets-Sheet 4

INVENTOR.
ROBERT SERRELL

BY Morris Rabkin

ATTORNEY

INVENTOR.
ROBERT SERRELL
BY Morris Rabkin
ATTORNEY

INVENTOR.
ROBERT SERRELL
BY Morris L. Rabkin
ATTORNEY

Feb. 16, 1960 R. SERRELL 2,925,220

FUNCTION GENERATOR

Filed Sept. 30, 1954 7 Sheets-Sheet 7

INVENTOR.
ROBERT SERRELL
BY Morris A. Rabkin
ATTORNEY

United States Patent Office 2,925,220

Patented Feb. 16, 1960

2,925,220

FUNCTION GENERATOR

Robert Serrell, Princeton, N.J., assignor to Radio Corporation of America, a corporation of Delaware Application September 30, 1954, Serial No. 459,449

11 Claims. (Cl. 235—197)

This invention relates to computing devices, and particularly to apparatus for generating functions of a plurality of independent variables.

Presently known apparatus for generating functions of one or more variables are described, for example, in the book "Electronic Analog Computers" by Korn and Korn, McGraw-Hill, 1952, page 245 ff. In order to generate such functions accurately, it is desirable to interpolate linearly between specified values of the function. Mathematically, exact linear interpolations for functions of one variable, which define a curve, generally involve the selection of two specified values of the function. The two values define a unique straight line between points of the curve, and interpolation there-between can be readily performed. In the case of a function of two variables which defines a curved surface, linear interpolation that is mathematically exact requires the selection of a unique linear region which is a plane. In the case of a function of three (or more) variables which defines a hypersurface in four (or more) dimensions, exact linear interpolation requires a unique linear region which is a hyperplane.

It is also desirable to compute automatically the gradient of a curved surface (or hypersurface) at any point on the surface. For example, given the atmospheric pressure at each of a number of fixed points such as to define a surface as a function of the coordinates of those points, it may be desired to compute the rectangular components to the atmospheric pressure gradient at any point on the surface.

It is among the objects of this invention to provide:

A new and improved apparatus for generating a function of a plurality of variables;

A new and improved apparatus for generating a function of a plurality of variables with linear interpolation;

A new and improved system for performing linear interpolation among given values of a function of a plurality of variables;

A new and improved system for deriving the gradients of a function of a plurality of variables.

In accordance with this invention a number of predetermined values of a function of a plurality of variables is provided. Each predetermined function value corresponds to a set of predetermined values of the variables. A means responsive to a set of particular values of the variables selects a plurality of the predetermined function values which define a linear triangular region in which is located the particular function value corresponding to the set of particular variable values. The gradient components of the function at the particular function value are derived by means for subtracting certain ones of the selected predetermined function values from others of these selected values. Linear interpolation means multiplies each of the gradient components by the difference between the predetermined value of the associated variable corresponding to one of the selected function values, and the particular value of the associated variable. Means for summing the products of these multiplications provides the particular interpolated value of the function corresponding to the set of particular variable values.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
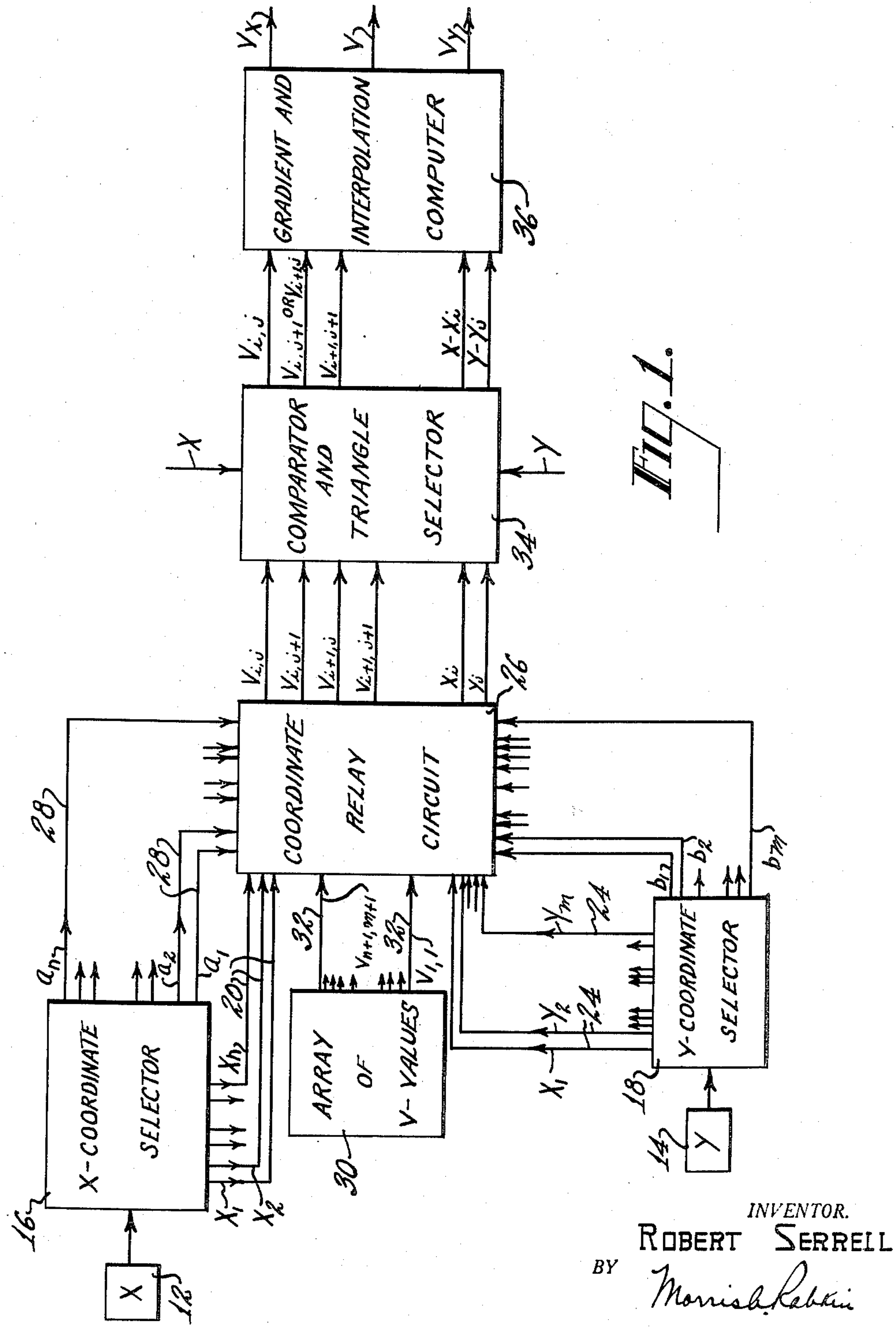
Figure 1 is a block diagram of a function generator embodying this invention for function of two variables.

Referring to Figure 1, apparatus embodying this invention for generating a function V of two variables X and Y includes a source 12 of the X variable signal and a source 14 of the Y variable signal. The variable signals are respectively applied to an X-coordinate selector 16 and a Y-coordinate selector 18. The X-coordinate selector 16 provides a plurality of predetermined variables of X, $X_1$ to $X_n$, on separate output leads 20. These predetermined X values correspond to the abscissas of the equally-spaced grid points 22 in the graph of Figure 2. Similarly, the Y coordinate selector 18 provides a plurality of predetermined Y values, $Y_1$ to $Y_m$, on separate output leads 24 which correspond to the ordinates of the grid points 22 in Figure 2. The X and Y output leads 20, 24 are connected to inputs of a coordinate relay circuit 26.

The X-coordinate selector 16 produces a selecting signal on one of $n$ selecting output lines 28 in accordance with the particular value of the X variable from the source 12. Only one of the selecting lines $a_1$ to $a_n$ receives a selecting signal. When the particular value of X lies between $X_i$ and $X_{i+1}$ the selecting signal is applied to the selector output $a_i$, where $i$ takes the values 1 to $n$. The X selecting lines $a_1$ to $a_n$ are connected to inputs of the coordinate relay circuit 26. The Y-coordinate selector 18 has similar selecting output lines $b_1$ to $b_m$ which are connected to inputs of the coordinate relay circuit 26. A single one $b_j$ of the selecting lines $b_1$ to $b_m$ receives a selecting signal when the value of the variable Y lies between $Y_j$ and $Y_{j+1}$ where $j$ assumes the values 1 to $m$.

Figure 2:
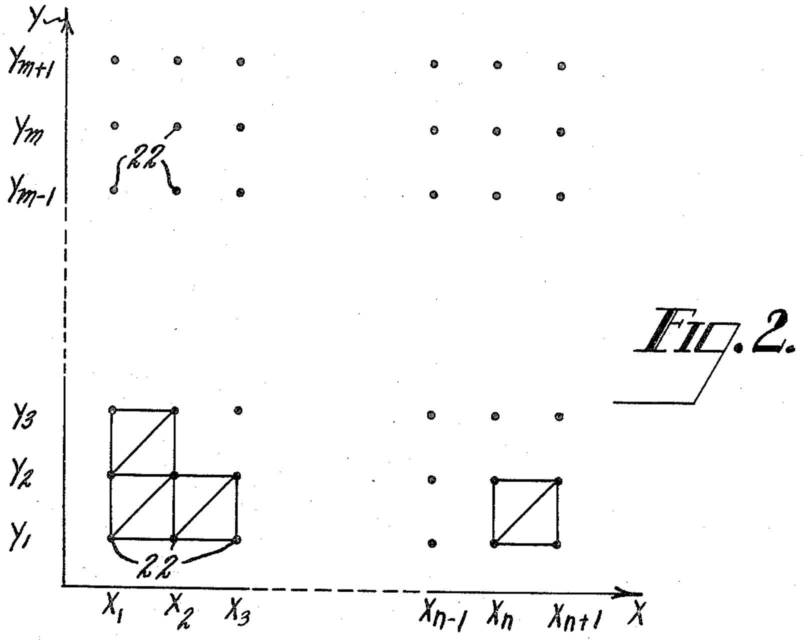
Figure 2 is an idealized graphical diagram of predetermined coordinate points that illustrate the mode of operation of the apparatus of Figure 1.

An array 30 of predetermined signal values of V is provided, each of which corresponds to the value of the function V at a different one of the grid points 22 of Figure 2. The subscripts of these V values are the corresponding X and Y subscripts. There are $(n+1)(m+1)$ of the predetermined values of V. These V values are applied to separate leads 32 which are connected to inputs of the coordinate relay circuit 26.

The coordinate relay circuit 26 provides as outputs the predetermined X value $X_i$ and the predetermined Y value $Y_j$ which correspond to the selecting signals on $a_i$ and $b_j$. In addition, the coordinate relay circuit 26 provides four predetermined values of V. One of these predetermined V values is the function value corresponding to $X_i, Y_j$. The other predetermined V values are the function values for the grid points 22 that complete a rectangle surrounding the point X, Y. The four predetermined V values from the coordinate relay circuit 26 are shown in the three-dimensional graph of Figure 3, in which one of the rectangles of Figure 2 is shown in the X—Y plane enclosing the point X, Y. This rectangle is identified as the *i, j* rectangle and is defined by the grid points having the *i* and $i+1$ abscissas and the *j* and $j+1$ ordinates.

The outputs of the coordinate relay circuit 26 are applied to a comparator and triangle selector 34. Also applied to this triangle selector 34 are the particular values of X and Y from the sources 12 and 14. The triangle selector 34 provides as outputs the differences $X-X_i$ and $Y-Y_j$ and the predetermined V values $V_{i,j}$ and $V_{i+1,j+1}$. In addition, one or the other of the predetermined V values, $V_{i+1,j}$ or $V_{i,j+1}$, is provided as an output accordingly as $X-X_i$ is greater than or less than $Y-Y_j$, respectively. The outputs of the triangle selector 34 are applied to a gradient and interpolation computer 36. This computer provides as outputs the interpolated value of the function V corresponding to the set of particular values of the variables X and Y and, also, the rectangular components, $V_x$ and $V_y$, of the gradient of the function V at the point X, Y.

Figure 4:
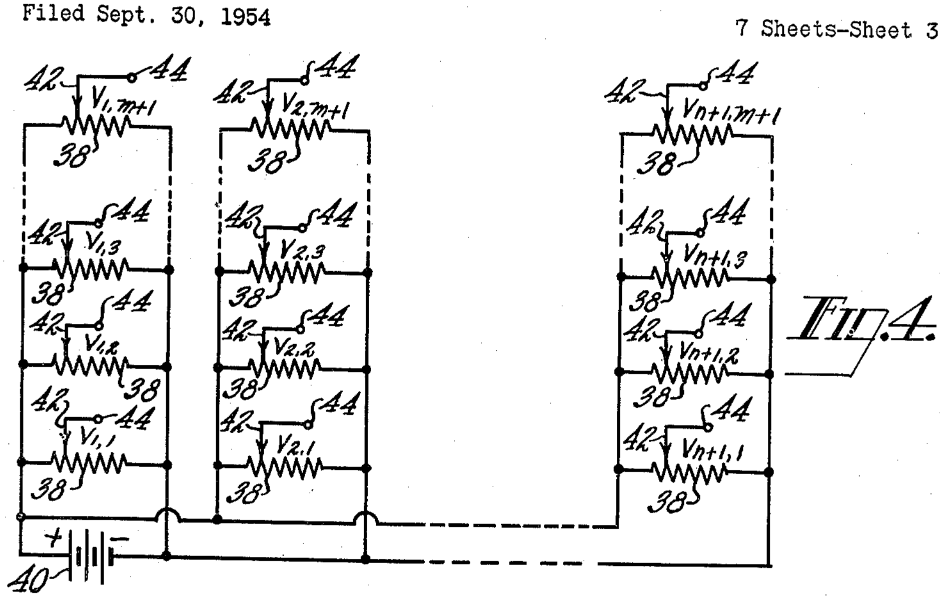
Figure 4 is a schematic circuit diagram of a potentiometer array that may be employed to provide an array of V values in the apparatus of Figure 1.

Referring to Figure 4, a potentiometer array is shown which may be employed as the array 30 of V values in the apparatus of Figure 1. There are $(n+1)$ $(m+1)$ potentiometers 38 which are all connected in parallel and to a suitable direct voltage source 40. Each of the potentiometers 38 correspond to a different one of the grid points 22 of the graph of Figure 2. The adjustable contact 42 of each potentiometer 38 can be adjusted independently of the others. The potentiometer contacts 42 are adjusted to provide voltages at the terminals 44 proportional to the predetermined values of the function for the corresponding grid points 22.

Figure 5:
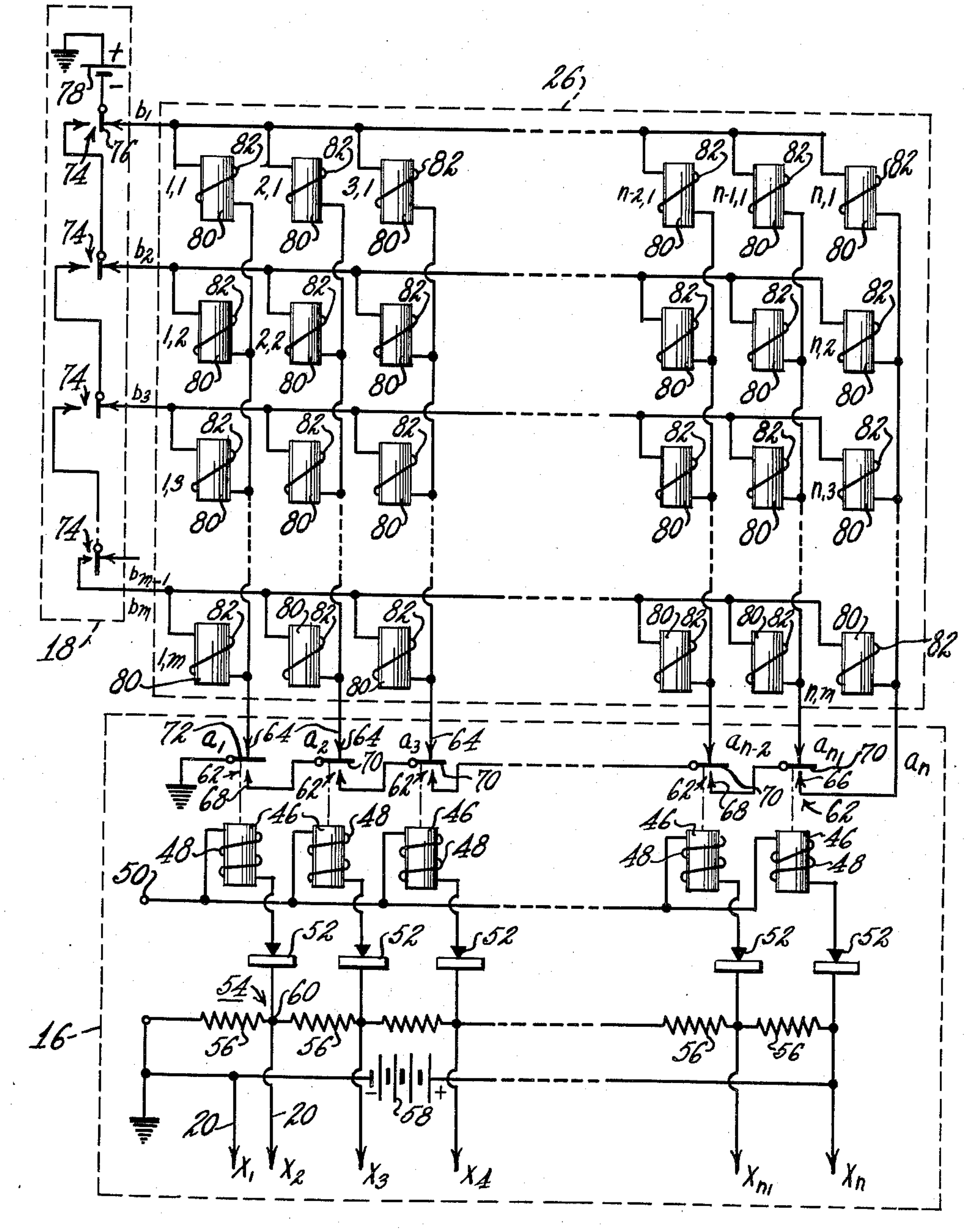
Figure 5 is a schematic circuit diagram of coordinate selectors and a coordinate relay circuit that may be employed in the apparatus of Figure 1.

Referring to Figure 5, X and Y coordinate selectors 16, 18 and a coordinate relay circuit 26 that may be used in the apparatus of Figure 1 are shown. The X-coordinate selector 16 includes $n-1$ relays 46. Connected to one end of each of the relay coils 48 is a common input terminal 50 to which a variable voltage proportional to X is applied. The anode of a different diode 52 is connected to the other end of each of the relay coils 48. A voltage divider 54 is made up of $n-1$ substantially identical resistors 56 that are connected in series. A direct voltage source 58 is connected across the voltage divider 54. The negative terminal of the voltage source 58 is connected to a reference terminal, shown as the conventional ground symbol. The cathode of the first diode 52 on the left is connected to the high voltage terminal 60 of the first voltage divider resistor 56 on the left. The other diodes 52 are similarly connected to the corresponding resistors 56. The ground terminal provides the predetermined X value $X_1$, and the other resistor terminals, in order, provide the predetermined X values $X_2$ to $X_n$. Each of the $n-1$ relays 46 carries a separate single-pole-double-throw switch 62. The first fixed contact 64 of each of the switches 62 is connected to a different selecting line $a_1$ to $a_n$. The second fixed contact 66 of the $n-1$ switch 62 is also connected to a selecting line $a_n$ so that *n* selecting lines $a_1$ to $a_n$ are provided. The second fixed contact 68 of each of the other switches 62 is connected to the pole 70 of the next switch in order. The pole 72 of the first switch 62 is connected to ground.

The switch poles 70, 72 contact the first contacts 64 when the relays are de-energized.

By means of the voltage divider 54 a different back voltage is applied to the cathode of each diode 52. This back voltage increases from the first to the last diode by equal increments which are equal to the increments between adjacent predetermined values of X. The back voltage is in the direction to inhibit conduction of the diodes 52. If the variable voltage X is smaller than the back voltage $X_2$, no diode 52 conducts and ground is applied to $a_1$. If X is larger than the back voltage $X_2$ but less than the back voltage $X_3$, only the first diode on the left conduits. As a result the first relay 46 is energized and the pole 72 of the first switch 62 is connected to the second contact 68 to transfer ground to $a_2$. Similarly, one of the selecting leads $a_3$ to $a_{n-1}$ is connected to ground as X varies from $X_3$ to $X_n$. If X is larger than $X_n$ all the diodes 52 conduct, all the relays 46 are energized and ground is transferred to $a_n$. Thus the X-coordinate selector 16 functions like a quantizing circuit to establish a correspondence between each value of a continuously variable voltage X and one and only one of *n* selecting lines $a_1$ to $a_n$.

The Y-coordinate selector 18 is susbtantially the same as the X-coordinate selector 16 just described. A correspondence is established between each value of a continuously variable voltage Y with one and only one of *n* selecting leads $b_1$ to $b_m$. Also, voltages proportional to the predetermined values $Y_1$ to $Y_n$ are provided. The switches 74 of the Y-selector are shown in Figure 5 connected in a chain circuit in the same manner as the switches of the X-selector. One difference is that the pole 76 of the first Y-selector switch is connected to a direct voltage source 78 instead of ground.

The coordinate relay circuit 26 includes an array of n by m relays 80 shown as a matrix of columns and rows in Figure 5. Each relay coil 82 is connected to one of the selecting lines $b_1$ to $b_m$ and to one of the selecting lines $a_1$ to $a_m$. Each relay 80 in the same column is connected to the same *a* selecting line and to a different *b* selecting line. Each relay 80 in the same row is connected to the same *b* selecting line and to a different *a* selecting line. Each of the relays 80 in the array correspond to a different one of the rectangles formed by four grid points 22 as shown in Figure 2 and is referenced by a pair of numbers corresponding to the *i* and *j* number that identify the corresponding rectangles in Figure 2.

The coordinate relay circuit 26, as shown in Figure 5, may be similar, for example, to the relay network of copending patent application, Serial No. 198,338, filed November 30, 1950, by this applicant, now U.S. Patent 2,696,600, issued December 7, 1954. The construction and mode of operation is described in detail in the aforementioned patent application. All the relays 80 in the circuit 26 are substantially identical and may be of the ordinary two-position type to actuate switches only when energized. If a selecting line, for example $a_1$, is connected to ground and selecting line $b_1$ is connected to the voltage source, relay 1,1 has the full voltage of the source 78 applied across its coil. The magnitude of the voltage applied across any of the other relay coils 82 that are connected directly or indirectly to selecting lines $a_1$ and $b_1$ is not greater than a fraction of the voltage across the coil of relay 1,1. As is evident, from the description in the above cited patent application, this fraction may be expressed by $$\frac{m-1}{(m-1)+(n-1)+1}$$

where *n* is not greater than *m*. Where $m=n$, it is seen that the voltage across the relay coils 82 other than the coil of selected relay 1,1 is not greater than ½ the voltage across the coil of relay 1,1. These relays 80 are each constructed so as to remain in the normal or de-energized position unless the voltage applied to the coil exceeds the aforementioned fraction of the voltage of the source. Such construction may be effected by appropriate adjustment of spring forces in conventional relays.

For any value of the variable X a selecting line $a_i$ is connected to ground, which line $a_i$ corresponds to a back voltage $X_i$ which is the largest back voltage of any of the conducting diodes 52. If no diode 52 conducts then $X_i$ is $X_1$. Similarly, for a particular value of Y a selecting line $b_j$ is connected to the voltage source, which line $b_j$ corresponds to the largest back voltage $Y_j$ of any of the conducting diodes (not shown) of the Y selector. The voltage $X_{i+1}$ is the next largest back voltage and, therefore, the smallest back voltage of any non-conducting diode 52 in the X selector; $Y_{j+1}$ is similarly defined. Accordingly, for any set of particular values of X and Y, selecting lines $a_i$ and $b_j$ are connected in circuit between the voltage source 78 and ground, and relay $i,j$ is the only one that is energized. This relay corresponds to the $i,j$ rectangle identified by the coordinates $X_i$ and $Y_j$.

Figure 6:
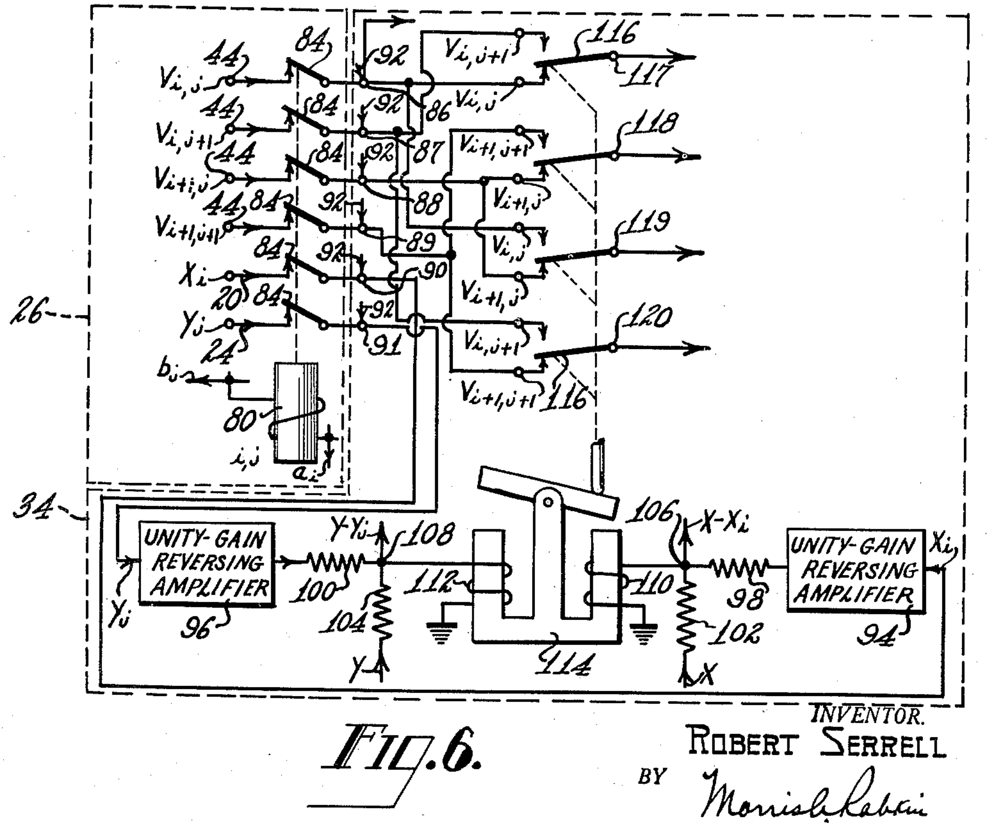
Figure 6 is a schematic circuit diagram of a comparator and triangle selector that may be employed in the apparatus of Figure 1 and of switch connections controlled by one of the coordinate relays of Figure 5.

Shown in Figure 6 is one of the relays 80 of the array shown in Figure 5. This relay is identified as relay $i,j$ to indicate that all of the other relays 80 are constructed and operate in the same manner. Each relay $i,j$ carries six normally open contacts 84 arranged to supply the following voltages when the relay is energized. The voltages $X_i$ and $Y_j$ from the X selector 16 and the Y selector 18, respectively, and the four predetermined function values from the array 30 that correspond to the grid points 22 of the $i,j$ rectangle. The six relay contacts 84 are connected to input terminals 86 to 91 of the comparator and triangle selector 34. These input terminals 86 to 91 are also connected to the corresponding contacts (not shown) of all of the other relays 80 of the array 26 as indicated by the single leads 92.

The comparator 34 includes two reversing linear feedback amplifiers 94, 96 possessing unity gain. The inputs of these amplifiers 94, 96 are respectively connected to the input terminals 90, 91 for $X_i$ and $Y_j$. The outputs of the X and Y reversing amplifiers 94, 96 are applied to terminals of separate X and Y summing resistors 98, 100. The variable voltages X and Y are respectively applied to terminals of separate second summing resistors 102, 104. The other terminals of the X summing resistors 98, 102 are connected together and similarly are the Y summing resistors 100, 104. The junctions 106, 108 of the X and Y summing resistors respectively provide the differences $X-X_i$ and $Y-Y_j$. These differences are respectively applied to coils 110, 112 on opposite legs of a differential relay 114. The differential relay 114 actuates four single-pole-double-throw switches 116. The eight fixed contacts of these switches 116 are variously connected to the four V input terminals 86 to 89 of the comparator 34. Terminals 117 to 120 at the poles of the comparator switches 116 provide the inputs to the gradient and interpolation computer 36.

Figure 3:
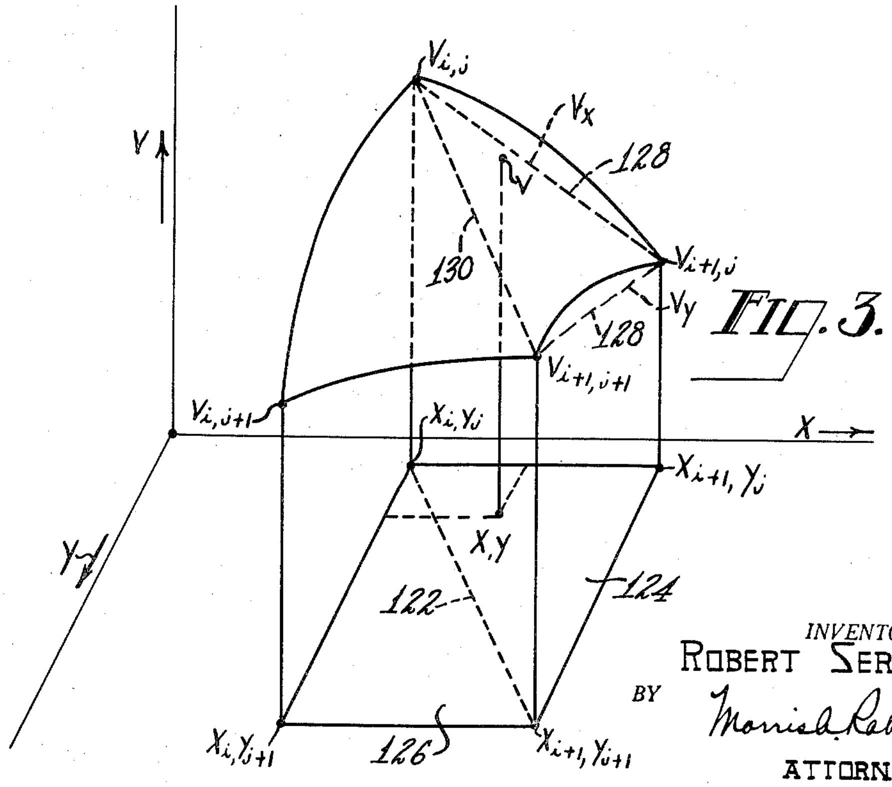
Figure 3 is an idealized graphical space diagram that illustrates the mode of operation of the apparatus of Figure 1.

The operation of the triangle selector 34 is illustrated by the graph of Figure 3. A diagonal 112 is drawn from the $X_i$, $Y_j$ identifying point of the $i,j$ rectangle to form two triangles 124, 126. If $X-X_i$ is greater than $Y-Y_j$, the point X,Y lies in the triangle 124, and if the reverse relation exists X,Y lies in the other triangle 126. The differential relay 114 compares the relative magnitude of the X and Y voltage differences to determine which of the two triangles 124, 126 the particular point X,Y is located. The poles of the switches 116 are actuated to supply V values corresponding to the three points of the proper triangle 124 or 126 to the computer 36. The arrangement of the poles 116 is such as to order the V values in the manner in which they are to be used by the computer 36, as described below. Also supplied to the computer 36 are the X and Y voltage differences from the junctions 106, 108 of the summing resistors. In Figure 6, the poles of switches 116 are in the down position for the point X,Y in triangle 124.

It is evident from Figure 3, that where the function is represented by a curved surface, the four V values selected by relay $i,j$ do not generally lie in a single plane. Accordingly, a unique linear interpolation, in general, is not available among those four selected V values. The triangle selector 34 operates to define a plane in which linear interpolation can be performed properly by consistently selecting a certain three of the predetermined V values. The unique plane 128 defined by the three selected V values, as shown in Figure 3, is the chordal plane for that segment of the surface in which lies the precise V value corresponding to the particular values X,Y. Therefore, this chordal plane 128 is a proper plane for linear interpolation.

If X,Y lies on the diagonal 122 of the $i,j$ rectangle, the proper value of V may be obtained by interpolation in either of the two chordal planes intersecting at the diagonal 130. Therefore, if X,Y initially lies in the triangle 124 in Figure 3 and then moves to the diagonal 122, the differential relay 114 remains in the condition shown in Figure 6. It is only after X,Y moves a small amount into the triangle 126 that the differential relay 114 is actuated to its opposite condition. This relay hysteresis may be made arbitrarily small by appropriate design of the relay 114 and its controlling circuits.

Figure 7:
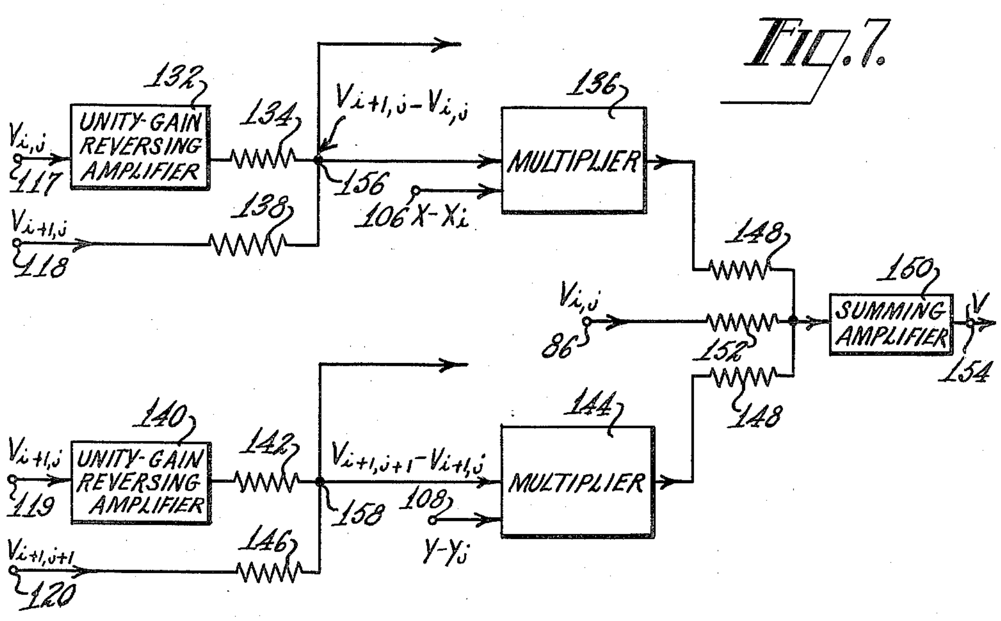
Figure 7 is a schematic block diagram of a gradient and interpolation computer that may be employed in the apparatus of Figure 1.

Referring to Figure 7, the computer 34 includes a unity-gain reversing amplifier 132 whose input is connected to the first input terminal 117. The output of the reversing amplifier 132 is connected through a summing resistor 134 to the first input of a multiplier 136. The second input terminal 118 is connected through a summing resistor 138 to the first input of the multiplier 136. The other input of the multiplier 136 receives the X difference voltage. The third input terminal 119 is connected to the input of a unity-gain reversing amplifier 140, the output of which is connected through a summing resistor 142 to the first input of a second multiplier 144. The fourth input terminal 120 is connected through a summing resistor 146 to the first input of the second multiplier 144. The second input of the second multiplier 144 receives the Y voltage difference from the comparator 34. The outputs of the two multipliers 136, 144 are connected through separate summing resistors 148 to the input of a summing amplifier 150. The input terminal 86 of the comparator for $V_{i,j}$ is connected directly through another summing resistor 152 to the input of the summing amplifier 150. The output 154 of the summing amplifier 150 is the desired interpolated value of the function V. Suitable circuits for the computer of Figure 7 are described in the book by Korn and Korn, cited above, chapters 4, 5, and 6.

The value of V obtained by linear interpolation if X, Y lies in the triangle 124 in Figure 3 is given by $$V=V_{i,j}+(V_{i+1,j}-V_{i,j})(X-X_i)+(V_{i+1,j+1}-V_{i+1,j})(Y-Y_j)$$

This condition is assumed for the position of the comparator switches 116 in Figure 6. The first product of this equation is produced by the first multiplier 136, and the second product is produced by the second multiplier 144. The voltage at the junction 156 of the summing resistors 134, 138 is the V-value difference term of the first product. Similarly, the voltage at the summing-resistor junction 158 is the V-value difference term of the second product. These V-value difference terms are, respectively, the rectangular components of the gradient of V along the X and Y axes. The above equation of the computer of Figure 7 is based on a fundamental relation that if V is a function of X and Y, the differential of V is equal to the sum of two products, namely, the product of the partial derivative of V with respect to X and the differential of X, and the product of the partial derivative of V with respect to Y and the differential of Y. If V is a linear function of X and Y, as in the case of linear interpolation, the partial derivatives are constant and the X and Y differentials are represented by finite differences. The X and Y differentials are, respectively, the X and Y voltage differences. Assuming uniform unity spacing of the X and Y grid points, the derivatives of V are equal to the differences between adjacent values of V. Thus, the interpolated value of V is obtained by adding the products of these differences with the X and Y differences to $V_{i,j}$ which leads to the above equation.

When the point X,Y is in the triangle 126 in Figure 3, the poles of the comparator switches 116 engage the upper contacts (Figure 6). The V values applied to the computer input terminals 117 to 120 are then those indicated at the upper fixed contacts. Under such conditions, the computer of Figure 7 operates to compute the gradient components and the interpolated value of V in the plane defined by the triangle 126. The equation solved by this computer for triangle 126 may be derived by substituting in the V difference terms of the above equation the corresponding V values indicated at the upper fixed contacts of the switches 116.

Figure 8:
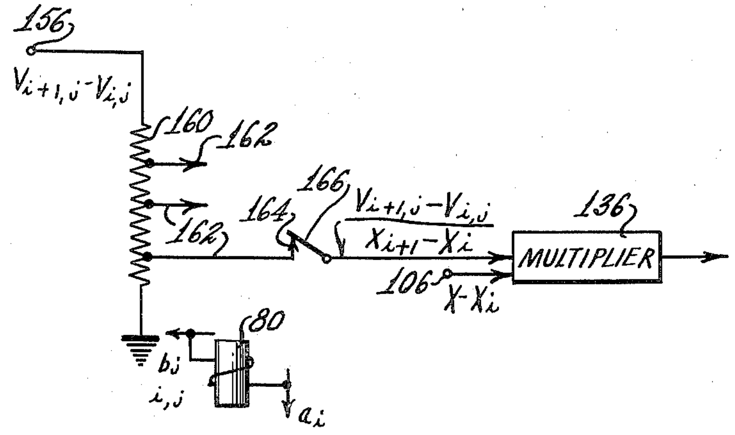
Figure 8 is a schematic circuit diagram of a modification of the apparatus of Figure 7.

The grid-point spacings (Figure 2) have been assumed to be uniformly equal and of unit value. If it is desired to use spacings that are not equal, the computer of Figure 7 can be modified in the manner shown in Figure 8. The V-difference voltage at terminal 156 is applied to one end of a voltage divider 160, the other end of which is at ground. A plurality of taps 162 are provided on the voltage divider 160, the number of taps 162 being equal to the number of distinct abscissa spacings, $X_{i+1}-X_i$. Each tap 162 is connected to the fixed contacts 164 of one or more switches (only one of which is shown). The poles 166 of all the switches are connected to the first input of the first multiplier 136. Each switch is controlled by a different one of the relays 80, only the *i,j* relay being shown to illustrate the arrangement for all the relays 80. The position of each tap 162 is such as to provide voltage division by the abscissa spacing of the *i,j* rectangle which corresponds to the *i,j* relay associated with that tap 162. Thus, when the *i,j* relay is energized, the proper voltage division is obtained in the computer. The smallest one of the abscissa spacings is adjusted to unity since voltage division in this manner cannot be performed with quantities smaller than unity. In a similar manner, another voltage divider circuit (not shown) is provided between the terminal 158 and multiplier 144 to provide voltage division by the ordinate spacing of the *i,j* rectangle, namely, $Y_{j+1}-Y_j$. Each relay 80 carries a second additional switch (not shown) to control such voltage division.

Figure 9:
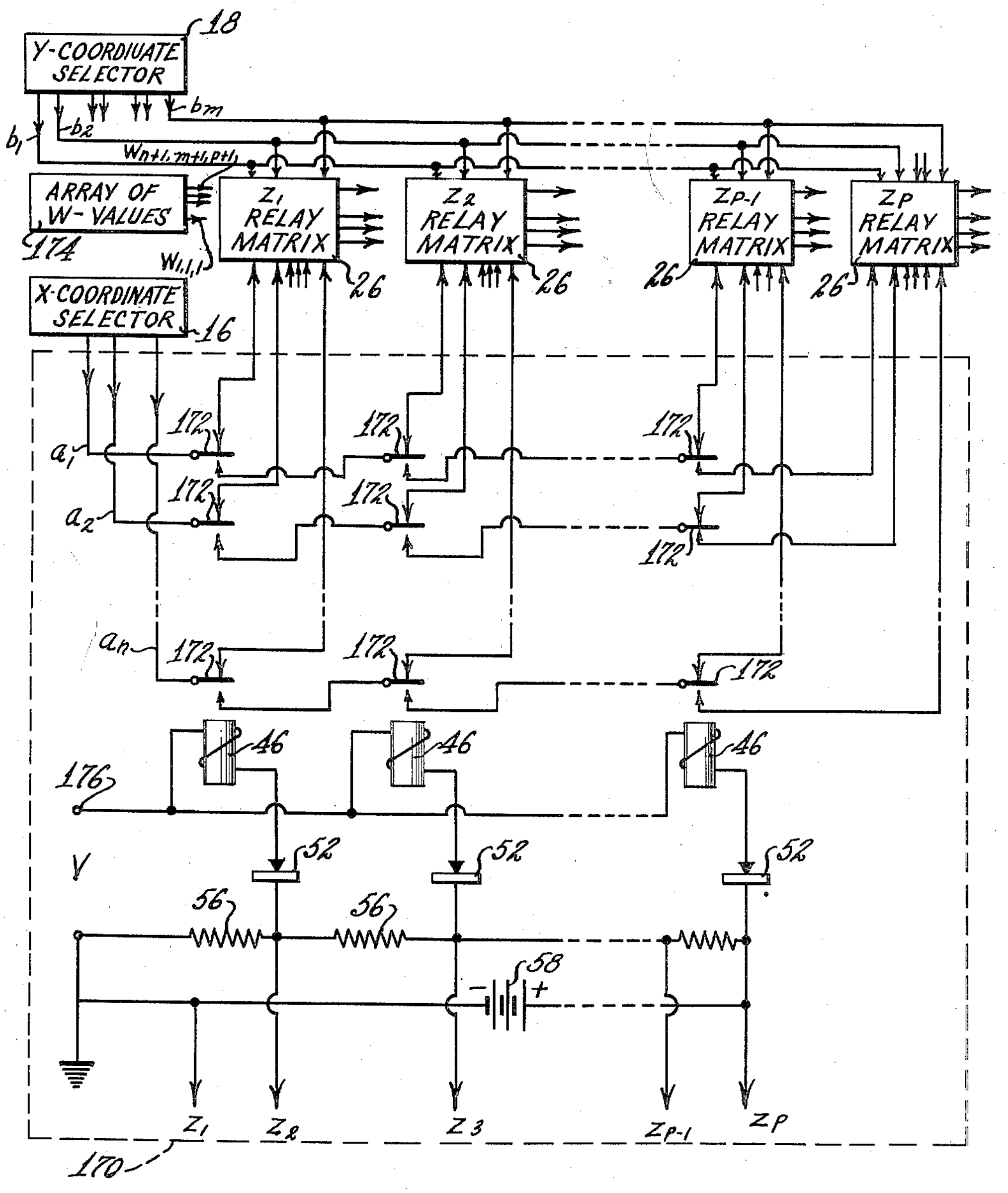
Fig. 9 is a block diagram of portions of apparatus for generating functions of three variables.
Figure 10:
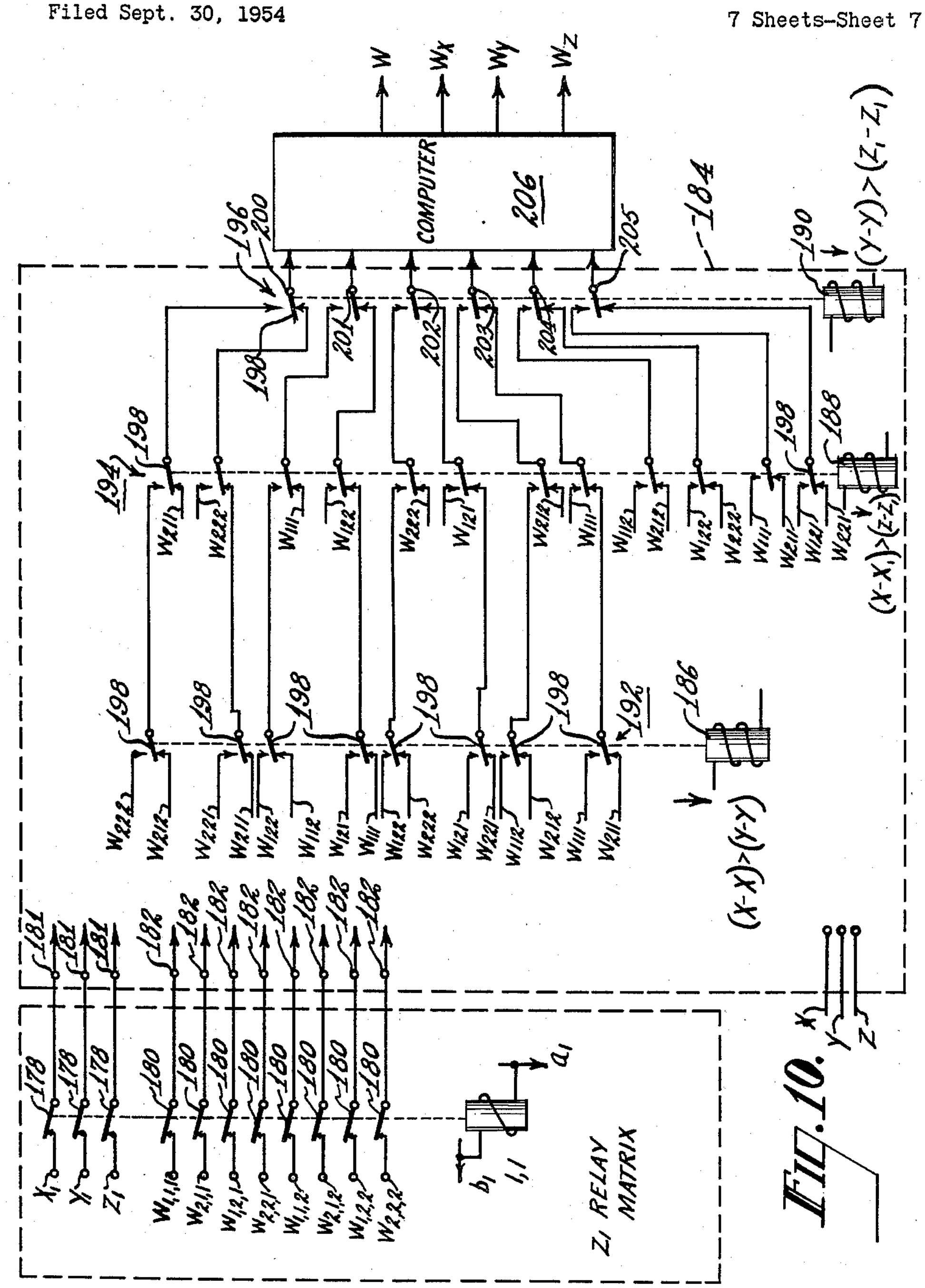
Figure 10 is a schematic circuit diagram of additional portions of apparatus used with the apparatus of Figure 9 for generating functions of three variables.

In Figures 9 and 10, apparatus for generating a function of three variables, $W=f(X,Y,Z)$, is shown. The same reference numerals are employed for parts previously described.

A Z-coordinate selector 170 is provided in addition to the X selector 16 and the Y selector. The Z selector provides $p$ predetermined Z values $Z_1$ to $Z_p$ in a manner similar to that described above for the X selector 16. Each Z-selector relay 46 carries $n$ single-pole-double-throw switches 172, each switch 172 being associated with a different one of the selecting lines $a_1$ to $a_n$ from the X selector 16. The switches 172 associated with the same selecting line $a_1$ to $a_n$ are connected in a separate chain circuit in the manner of the X-selector switches 62. There are $p$ coordinate relay circuits 26, each associated with one of the Z values $Z_1$ to $Z_p$. Each selecting line $a_1$ to $a_n$ is connected to the pole of the first switch 172 in the associated chain circuit. The selecting lines $a_1$ to $a_n$ are connected through the associated chain circuits to each of the Z relay circuits 26. The Y selecting lines $b_1$ to $b_m$ are all connected to each of the Z relay circuits 26. The voltages $X_1$ to $X_n$, $Y_1$ to $Y_n$ and $Z_1$ to $Z_p$ are applied (not shown) to each of the Z relay circuits 26. An array 174 of predetermined W-values, $W_{111}$ to $W_{n+1,m+1,p+1}$, is employed in the same manner as the V-value array 30 of Figure 1.

Only one of the Z relay circuits 26 is connected to the selecting lines $a_1$ to $a_n$ through the switches 172 depending upon the particular value of Z applied to terminal 176 of the Z selector 170. It is assumed for purpose of illustration that the particular value of Z is between $Z_1$ and $Z_2$, X is between $X_1$ and $X_2$, and Y is between $Y_1$ and $Y_2$. Thus, none of the Z-selector relays 46 and energized, the $Z_1$ relay matrix 26 is connected to the selecting lines $a_1$ to $a_n$, and the 1,1 relay of the $Z_1$ matrix 26 is energized (Figure 10).

Each relay 80 of the Z relay matrices 26 corresponds to a cube (not shown) in space which is identified by the apex of the cube $X_i,Y_j,Z_k$ in the same way as the grid point $X_i,Y_j$ identifies *i,j* rectangle of Figure 3. In the situation assumed, the 1,1,1 cube contains the point X,Y,Z, and the 1,1 relay of the $Z_1$ matrix 26 is energized as shown in Figure 3. The relays 80 are the same, and only the 1,1 relay shown in Figure 10 is described.

The 1,1 relay of the $Z_1$ matrix carries eleven transfer switches 178, 180. Three of the switches 178 select the predetermined coordinate values $X_1$, $Y_1$ and $Z_1$ for the apex identifying the 1,1,1 cube. The eight other switches 180 select the predetermined W values that correspond to each of the eight apexes of the 1,1,1 cube. Each of the switches 178, 180 is connected to a different one of the input terminals 181, 182, respectively, of the comparator 184. The corresponding switches (not shown) of the other matrix relays 80 are also connected to the terminals 181, 182 in a similar manner.

The comparator 184, in three dimensions, is analogous to the comparator 34 in two dimensions. The comparator 184 includes three differential relays 186, 188, 190, which respectively compare the relative magnitudes of the X and Y voltage differences, the X and Z voltage differences, and the Y and Z voltage differences. Each differential relay 186, 188, 190 controls a different group 192, 194, 196 of single-pole-double-throw switches 198. The fixed contacts of the first group 192 of switches 198, and of some of the second group 194 switches 198 are variously connected to the input terminals 182, as shown in Figure 10 where W identifications replace lead lines. The poles of the switches 198 are variously connected to fixed contacts of the succeeding group of switches 198. The switch poles of the last group 196 are connected to six terminals 200 to 205 that are the inputs to the computer 206.

The comparator 184 is based on the principle that four points in three-dimensional space generally define a unique tetrahedron which is a linear region or hyperplane. The X, Y and Z selectors 16, 18, 170 serve to divide the X—Y—Z coordinate space into equal cubes. The Z relay matrices 26 operate to identify the one of these coordinate cubes that contains the particular point X, Y, Z. Each of the coordinate cubes can be divided into six equal tetrahedrons in such a way that each tetrahedron has as one of its apexes the identifying point $X_i,Y_j,Z_k$, and has as its other three apexes three of the other seven apexes of the cube. These six tetrahedrons are defined by the diagonals from the identifying apex through the three cube faces that include the identifying apex.

The comparator 184 determines in which of the six tetrahedrons the point X,Y,Z lies by separately comparing each of the X, Y, and Z voltage differences with the others. At the same time, the comparator 184 selects the predetermined W values corresponding to the apexes of the *i,j,k* cube and arranges the selected W values in the proper way for use by the computer 206. The details of this operation will be evident from the above description of the comparator 34.

The W values that are switched to the terminals 200 to 205 for the different tetrahedrons that are selected are shown in the following table:

| Tetrahedron Selected | W-Value Switches to Terminal— | | | | | |
|---|---|---|---|---|---|---|
| | 200 | 201 | 202 | 203 | 204 | 205 |
| 1 | $W_{211}$ | $W_{111}$ | $W_{221}$ | $W_{211}$ | $W_{222}$ | $W_{221}$ |
| 2 | $W_{211}$ | $W_{111}$ | $W_{222}$ | $W_{212}$ | $W_{212}$ | $W_{211}$ |
| 3 | $W_{221}$ | $W_{121}$ | $W_{121}$ | $W_{111}$ | $W_{222}$ | $W_{221}$ |
| 4 | $W_{222}$ | $W_{122}$ | $W_{121}$ | $W_{111}$ | $W_{122}$ | $W_{121}$ |
| 5 | $W_{212}$ | $W_{112}$ | $W_{222}$ | $W_{212}$ | $W_{112}$ | $W_{111}$ |
| 6 | $W_{222}$ | $W_{122}$ | $W_{122}$ | $W_{112}$ | $W_{112}$ | $W_{111}$ |

The first tetrahedron is selected where the X voltage difference is greater than the Y and Z differences, and the Y difference is greater than the Z difference. The results of the voltage-difference comparisons for the other tetrahedrons are as follows: the second tetrahedron requires X greater than Y and Z, Y less than Z; the third requires X less than Y, Z less than X and Y; the fourth requires X less than Y and Z, Y greater than Z; the fifth requires X greater than Y, Z greater than X and Y; and the sixth requires X less than Y and Z, Y less than Z.

It is seen from the above table that four different W values (plus two duplications) are provided as the outputs of the comparator and tetrahedron selector 184 for each tetrahedron selected. These four different W values define a tetrahedron that is a projection in four-dimensional space of the tetrahedron encompassing the point X,Y,Z. This W-value tetrahedron is a linear region or hyperplane in which a linear interpolated value of W is located. Accordingly, exact linear interpolation can be performed among the selected W values by the computer 206.

The computer 206 includes an arrangement of multipliers and summing networks (not shown) similar to that of the computer 36. The equation solved by the computer 206 when the first tetrahedron is the one selected in the 1,1,1 cube is $$W=W_{111}+(W_{211}-W_{111})(X-X_1)+(W_{221}-W_{211})(Y-Y_1)+(W_{222}-W_{221})(Z-Z_1)$$

The first term $W_{111}$ is taken directly from the associated comparator input terminal 182. The remaining W terms of this equation, in order, are the voltages respectively appearing at the terminals 201 to 205 as shown in the above table. The X, Y and Z voltage differences may be derived from the comparator 184 similarly as in the two-variable function generator. The computer 206 may be the same as that shown in Figure 7 for the first two products of the above equation with the addition of another multiplier and associated summing network (not shown) for the last product. The gradient components $W_x$, $W_y$ and $W_z$ are the W difference terms of the above equation.

The equations for the other tetrahedrons may be derived by substituting the corresponding terms of the associated lines of the above table for the W terms in the above equation. The operation of the comparator 184 and computer 206 is the same for any cube *i,j,k* selected by the Z relay matrices.

It is seen that the function generator of this invention performs linear interpolation in a mathematically exact manner and provides a unique interpolated function value for each set of variable values. Interpolation is accomplished by fitting adjacent linear triangular regions over the entire region of the function. Where a two-variable function is generated, plane triangles are employed; and for a three-variable function, tetrahedrons are employed. Such linear triangular regions are the geometrical figures which can always be fitted in this manner without overlap and without discontinuity.

It is evident from the above description of this invention that new and improved apparatus is provided for generating functions of a plurality of variables. This apparatus performs linear interpolation in a mathematically exact manner, and may be used for deriving the gradients of a function.

What is claimed is:

1. A computing device for deriving a particular value of a function of a plurality of variables from predetermined values of said function, each of said predetermined function values corresponding to a different set of predetermined values of said variables, said computing device comprising means for supplying said predetermined function values, means responsive to a set of particular values of said variables for selecting three of said predetermined function values which define a triangular region in which is located a point corresponding to said set of particular variable values, and means for interpolating linearly in said triangular region among said selected predetermined function values.

2. A computing device as recited in claim 1 wherein said function is a function of two variables, and said triangular region is a plane triangle.

3. A computing device as recited in claim 1 wherein said function is a function of three variables, and said triangular region is a tetrahedron in three dimensions.

4. In a function generating device for generating a function of a plurality of variables in which a means is operable to make available predetermined values of said function each corresponding to a different set of predetermined values of said variables, the combination comprising means responsive to a set of particular values of said variables for selecting three of said predetermined function values which define a triangular region in which is located a particular function value corresponding to said set of particular variable values, and means for deriving differences between certain ones of said selected predetermined function values and others of said selected function values.

5. A computing device as recited in claim 4 wherein said selecting means includes means for selecting the predetermined variable values corresponding to said predetermined function values, and further comprising means for deriving the difference between each of said particular variable values and the associated one of said selected predetermined variable values, means for deriving the product of each of said function value differences and one of said variable value differences, and means for summing said products.

6. A computing device for deriving gradient components of a particular value of a function of two variables from predetermined values of said function, each of said predetermined function values corresponding to a different set of predetermined values of said variables, said computing device comprising means for supplying said predetermined function values, means responsive to a set of particular values of said variables for selecting three of said predetermined function values which define a plane in which is located a point corresponding to said set of particular variable values, and means for deriving differences between certain ones of said selected predetermined function values and others of said selected function values.

7. A computing device for deriving gradient components of particular values of a function of a plurality of variables comprising means providing an array of predetermined function values each corresponding to a different coordinate set of predetermined values of said variables, means responsive to a coordinate set of particular variable values for selecting a plurality of said predetermined function values which define a triangular region and which correspond individually to sets of said predetermined variable values that encompass as coordinates said set of particular variable values, and means for deriving differences between certain ones of said selected predetermined function values and others of said selected function values.

8. A computing device whose operation is characterized by a function of a plurality of variables comprising means providing a plurality of predetermined values of said variables, means providing an array of predetermined function values each corresponding to a different coordinate set of said predetermined variable values, means responsive to a coordinate set of particular variable values for selecting a set of adjacent predetermined variable values, and means for selecting, in accordance with the relative magnitudes of the differences between the particular variable values and the associated selected variable values, the one of said predetermined function values corresponding to the selected set of adjacent predetermined variable values and a plurality of others of said predetermined function values each corresponding to a set of said predetermined variable values that together with said selected set of variable values encompass as coordinates said set of particular variable values, said selected function values defining a triangular region.

9. A computing device as recited in claim 8 and further comprising gradient computing means, said computing means including means for deriving differences between certain ones of said selected function values and others of said selected function values.

10. A computing device as recited in claim 9 and further comprising means for linearly interpolating in said triangular region, said interpolating means including means for deriving the product of each of said function value differences and the one of said variable value differences that has an associated coordinate relationship, and means for summing said products and said one selected function value corresponding to said selected set of variable values.

11. A computing device as recited in claim 8 wherein said function is a function of two variables, said variable and function values are in the form of electrical voltages, wherein said means providing predetermined variable values include separate resistors, wherein said means providing an array of predetermined function values include a plurality of adjustable potentiometers, wherein said means for selecting a set of predetermined variable values includes separate quantizing means for each of said variables, and an array of relay means each corresponding to one of said predetermined function values, each of said quantizing means including a plurality of channels each corresponding to one of said predetermined values of the associated variable, and means responsive to said particular variable values for producing a selecting signal on the one of said channels corresponding to said adjacent predetermined variable value, said relay means including means responsive to said selecting signals for both variables for switching said adjacent variable values, the corresponding predetermined function value and three other predetermined function values that correspond to sets of predetermined variable values that together with said selected set of variable values encompass said set of particular variable values, wherein said means for selecting said predetermined function values includes means for deriving the differences between each of said particular variable values and the associated switched variable values, and relay means responsive to the relative magnitudes of said variable value difference for switching three of said four switches function values, said three switched function values corresponding individually to said predetermined variable values that encompass as coordinates said set of particular variable values.

References Cited in the file of this patent

UNITED STATES PATENTS

| | | |
|---|---|---|
| 2,428,811 | Rajchman | Oct. 14, 1947 |
| 2,797,865 | Beattie et al. | July 2, 1957 |